United States Patent
Liu et al.

(10) Patent No.: US 10,469,445 B2
(45) Date of Patent: Nov. 5, 2019

(54) METHOD FOR COMMUNICATION BETWEEN NETWORK DEVICE AND TERMINAL DEVICE, NETWORK DEVICE, AND TERMINAL DEVICE

(71) Applicant: Huawei Technologies Co., Ltd., Shenzhen (CN)

(72) Inventors: Bing Liu, Beijing (CN); Yang Bo, Beijing (CN); Sheng Jiang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 128 days.

(21) Appl. No.: 15/702,077

(22) Filed: Sep. 12, 2017

(65) Prior Publication Data
US 2018/0013721 A1    Jan. 11, 2018

Related U.S. Application Data

(63) Continuation of application No. PCT/CN2015/074207, filed on Mar. 13, 2015.

(51) Int. Cl.
*H04L 29/12* (2006.01)
*H04L 12/741* (2013.01)
(Continued)

(52) U.S. Cl.
CPC .............. *H04L 61/25* (2013.01); *H04L 41/12* (2013.01); *H04L 45/74* (2013.01); *H04L 61/35* (2013.01);
(Continued)

(58) Field of Classification Search
CPC ......... H04L 63/14; H04L 41/12; H04L 61/35; H04L 45/74; H04L 61/25; H04L 45/7457; H04L 45/02
See application file for complete search history.

(56) References Cited

U.S. PATENT DOCUMENTS 7,523,485 B1    4/2009  Kwan
2002/0161918 A1*  10/2002  Asano ................... H04L 45/04
                                                                        709/238
(Continued)

FOREIGN PATENT DOCUMENTS

CN          101241513 A      8/2008
CN          101557397 A      10/2009
(Continued)

OTHER PUBLICATIONS

Bi et al., "A SAVI Solution for WLAN draft-bi-savi-wlan-07.txt," Network Working Group, Internet Draft, Intended status: Standard Tracks, XP015104617, pp. 1-12, IETF Trust (Feb. 5, 2015).

(Continued)

*Primary Examiner* — Brian D Nguyen
(74) *Attorney, Agent, or Firm* — Leydig, Voit & Mayer, Ltd.

(57) ABSTRACT

The present disclosure provides a method for communication between a network device and a terminal device, where the network device stores a correspondence between a link-layer address and an IP address that are of the terminal device, and the method includes: obtaining, by the network device, a first link-layer address; determining whether a quantity of IP addresses corresponding to the first link-layer address reaches a threshold; if the quantity reaches the threshold, selecting an IP address from the IP addresses, where a quantity of selected IP addresses is not greater than the maximum quantity; saving a correspondence between the first link-layer address and the selected IP address; and sending, according to the selected IP address, a message to a terminal device having the first link-layer address, where the message is used to notify the terminal device whether an IP address is selected by the network device.

20 Claims, 5 Drawing Sheets

(51) Int. Cl.
  *H04L 29/06* (2006.01)
  *H04L 12/24* (2006.01)
  *H04L 12/743* (2013.01)
  *H04L 12/751* (2013.01)

(52) U.S. Cl.
  CPC .............. *H04L 63/14* (2013.01); *H04L 45/02* (2013.01); *H04L 45/7457* (2013.01)

(56) References Cited

U.S. PATENT DOCUMENTS

| | | | |
|---|---|---|---|
| 2004/0063402 A1* | 4/2004 | Takeda | H04W 8/12 455/41.1 |
| 2004/0081122 A1* | 4/2004 | Koodli | H04L 29/12264 370/329 |
| 2005/0018683 A1 | 1/2005 | Zhao et al. | |
| 2007/0147300 A1* | 6/2007 | Jee | H04W 36/0016 370/331 |
| 2008/0031189 A1* | 2/2008 | Choi | H04L 29/12216 370/329 |
| 2010/0316019 A1* | 12/2010 | Liu | H04L 29/12264 370/331 |
| 2013/0223438 A1 | 8/2013 | Tripathi et al. | |
| 2014/0146823 A1 | 5/2014 | Angst et al. | |
| 2016/0043942 A1* | 2/2016 | Purohit | H04W 40/244 370/338 |
| 2016/0174148 A1* | 6/2016 | Seed | H04W 52/0216 370/311 |

FOREIGN PATENT DOCUMENTS

| | | |
|---|---|---|
| CN | 101567886 A | 10/2009 |
| CN | 101621525 A | 1/2010 |
| CN | 102143072 A | 8/2011 |
| CN | 103078799 A | 5/2013 |
| CN | 103856406 A | 6/2014 |

OTHER PUBLICATIONS

Gont et al.,"Security Assessment of Neighbor Discovery (ND) for IPv6 draft-ietf-opsec-ipv6-nd-security-00," Network Norking Group, Internet-Draft Intended status: Informational, XP015095878, pp. 1-62, IETF (Oct. 22, 2013).

Gont et al., "Security Assessment of Neighbor Discovery (ND) for IPv6, draft-gont-opsec-ipv6-nd-security-02," Network Working Group, Internet-Draft (Oct. 22, 2013).

\* cited by examiner

METHOD FOR COMMUNICATION BETWEEN NETWORK DEVICE AND TERMINAL DEVICE, NETWORK DEVICE, AND TERMINAL DEVICE

CROSS-REFERENCE TO RELATED APPLICATIONS

This application is a continuation of International Application No. PCT/CN2015/074207, filed on Mar. 13, 2015, the disclosure of which is hereby incorporated by reference in its entirety.

TECHNICAL FIELD

The present disclosure relates to the field of communications technologies, and in particular, to a method for communication between a network device and a terminal device, and an apparatus.

BACKGROUND

Generally, a network device may store a correspondence between a link-layer address and an Internet Protocol (IP) address by using a ternary content-addressable memory (TCAM). In consideration of disadvantages of the TCAM in terms of price and power consumption, many TCAMs are usually not deployed on the network device. Therefore, on the network device, space for storing the correspondence between a link-layer address and an IP address is limited.

As a network is continuously extended, a quantity of terminal devices that communicate with a network device is increased. In addition, a terminal device that supports the Internet Protocol version 6 (IPv6) may have one or more IPv6 addresses. Therefore, a problem that storage space of the network device is insufficient easily occurs.

At present, an aging mechanism is usually used to delete a correspondence, between a link-layer address and an IP address, that is stored in a network device and that is in an inactive state, so as to relieve a problem that cache space of the network device is insufficient. For example, a correspondence that is between a link-layer address and an IP address and that is not refreshed in a preset time period may be aged. However, the aging mechanism can only prevent a terminal device that already gets offline or a terminal device that has been inactive for a long time from occupying cache space of the network device for a long time, but the problem that storage space of the network device is insufficient cannot be effectively relieved.

SUMMARY

According to a method for communication between a network device and a terminal device, a network device, and a terminal device in embodiments of the present disclosure, a problem that cache space of a network device is insufficient can be effectively relieved. In addition, the network device determines validity of an IP address according to a link-layer address of a terminal device, so as to reduce a loss of a data packet of the terminal device in a communication process.

In view of this, the embodiments of the present disclosure provide the following technical solutions.

According to a first aspect, a method for communication between a network device and a terminal device is provided, where the network device stores information, the information includes a correspondence between a link-layer address and an Internet Protocol IP address that are of the terminal device, the information is used to guide the network device to process a packet that is from the terminal device, and the method includes:

obtaining, by the network device, a first link-layer address;

determining, by the network device, whether a quantity of IP addresses corresponding to the first link-layer address in the information reaches a threshold, where the threshold indicates a maximum quantity of IP addresses that are corresponding to the first link-layer address and that can be stored in the network device;

if the quantity of IP addresses corresponding to the first link-layer address in the information reaches the threshold, selecting, by the network device, an IP address from the IP addresses corresponding to the first link-layer address, where a quantity of selected IP addresses is not greater than the maximum quantity;

saving, by the network device, a correspondence between the first link-layer address and the selected IP address; and sending, by the network device according to the selected IP address, a message to a terminal device having the first link-layer address, where the message is used to notify the terminal device having the first link-layer address whether an IP address is selected by the network device.

With reference to the first aspect, in a first possible implementation of the first aspect, the obtaining, by the network device, a first link-layer address includes: obtaining, by the network device, the first link-layer address from the information;

correspondingly, the selecting, by the network device, an IP address from the IP addresses corresponding to the first link-layer address includes: selecting, by the network device, the IP address from the IP addresses corresponding to the first link-layer address in the information; and the threshold is the maximum quantity, and that the quantity of IP addresses corresponding to the first link-layer address in the information reaches the threshold includes: the quantity of IP addresses corresponding to the first link-layer address in the information is greater than the threshold.

With reference to the first aspect, in a second possible implementation of the first aspect, the obtaining, by the network device, a first link-layer address includes: receiving, by the network device, a packet sent by the terminal device having the first link-layer address, where the packet includes the first link-layer address and a first IP address; and correspondingly, the selecting, by the network device, an IP address from the IP addresses corresponding to the first link-layer address includes: selecting, by the network device, an IP address from the IP addresses corresponding to the first link-layer address in the information and the first IP address.

With reference to the second possible implementation of the first aspect, in a third possible implementation of the first aspect, the threshold is obtained by subtracting 1 from the maximum quantity, and that the quantity of IP addresses corresponding to the first link-layer address in the information reaches the threshold includes: the quantity of IP addresses corresponding to the first link-layer address in the information is greater than the threshold; or the threshold is the maximum quantity, and that the quantity of IP addresses corresponding to the first link-layer address in the information reaches the threshold includes: the quantity of IP addresses corresponding to the first link-layer address in the information is not less than the threshold.

With reference to the second or the third possible implementation of the first aspect, in a fourth possible implementation of the first aspect, before the determining, by the network device, whether a quantity of IP addresses corresponding to the first link-layer address in the information reaches a threshold, the method further includes:

determining, by the network device, whether the information includes a correspondence between the first link-layer address and the first IP address; and the determining, by the network device, whether a quantity of IP addresses corresponding to the first link-layer address in the information reaches a threshold is performed when it is determined that the information does not include the correspondence between the first link-layer address and the first IP address.

With reference to any one of the first aspect, or the first to the fourth possible implementations of the first aspect, in a fifth possible implementation of the first aspect, the message sent by the network device to the terminal device having the first link-layer address is an RA message or an NA message, the message includes an option field, and the option field is used to carry the selected IP address.

With reference to the fifth possible implementation of the first aspect, in a sixth possible implementation of the first aspect, the option field includes a type, a length, and a value, where the type indicates that a type of the option field is notifying an IP address selected by the network device, the length indicates a length of the option field, and the value is the selected IP address.

With reference to any one of the first aspect, or the first to the fourth possible implementations of the first aspect, in a seventh possible implementation of the first aspect, the message sent by the network device to the terminal device having the first link-layer address is an ICMPv6 message, and the message notifies the terminal device having the first link-layer address whether an IP address is selected by the network device.

With reference to the seventh possible implementation of the first aspect, in an eighth possible implementation of the first aspect, the ICMPv6 message includes a type, code, and a packet content field, where the type indicates that a type of the ICMPv6 message is notifying an IP address selected by the network device, the code indicates that a type of the packet content field is notifying an IP address selected by the network device, and the packet content field is the selected IP address.

With reference to the seventh possible implementation of the first aspect, in a ninth possible implementation of the first aspect, the ICMPv6 message includes a type, code, and a packet content field, where the type indicates that a type of the ICMPv6 message is notifying an IP address not selected by the network device, the code indicates that a type of the packet content field is notifying that the first IP address is not selected by the network device, and the packet content field is the first IP address, or the packet content field is an indication indicating that the first IP address is not selected by the network device, or the packet content field is the packet.

With reference to any one of the first aspect, or the first to the ninth possible implementations of the first aspect, in a tenth possible implementation of the first aspect, the selecting, by the network device, an IP address from the IP addresses corresponding to the first link-layer address includes:

obtaining, by the network device according to a priority of an IP address, an order of priorities of IP addresses corresponding to the first link-layer address; and obtaining, by the network device in descending order of the priorities, the selected IP address from the order according to the maximum quantity; or obtaining, by the network device according to a storage time of an IP address, an order of storage times of IP addresses corresponding to the first link-layer address; and obtaining, by the network device in chronological order of the storage times, the selected IP address from the order according to the maximum quantity; or obtaining, by the network device according to a storage time of an IP address, an order of storage times of IP addresses corresponding to the first link-layer address; and obtaining, by the network device in reverse chronological order of the storage times, the selected IP address from the order according to the maximum quantity.

With reference to any one of the second to the tenth possible implementations of the first aspect, in an eleventh possible implementation of the first aspect, if the quantity of IP addresses corresponding to the first link-layer address in the information does not reach the threshold, the method further includes:

saving, by the network device, the correspondence between the first link-layer address and the first IP address.

According to a second aspect, a method for communication between a terminal device and a network device is provided, and the method includes:

receiving, by a terminal device having a link-layer address, a message sent by the network device, where the message is used to notify the terminal device whether an IP address is selected by the network device, and the message carries the link-layer address;

determining, by the terminal device according to the message, an IP address selected by the network device, where the selected IP address is corresponding to the link-layer address; and sending, by the terminal device, a packet to the network device, where a source IP address of the packet is the IP address selected by the network device, and a source link-layer address of the packet is the link-layer address.

With reference to the second aspect, in a first possible implementation of the second aspect, the message received by the terminal device is an RA message or an NA message, the message includes an option field, and the option field is used to carry the selected IP address.

With reference to the first possible implementation of the second aspect, in a second possible implementation of the second aspect, the option field includes a type, a length, and a value, where the type indicates that a type of the option field is notifying an IP address selected by the network device, the length indicates a length of the option field, and the value is the selected IP address.

With reference to the second aspect, in a third possible implementation of the second aspect, the message received by the terminal device is an ICMPv6 message, and the message notifies the terminal device whether an IP address is selected by the network device.

With reference to the third possible implementation of the second aspect, in a fourth possible implementation of the second aspect, the ICMPv6 message includes a type, code, and a packet content field, where the type indicates that a type of the ICMPv6 message is notifying an IP address selected by the network device, the code indicates that a type of the packet content field is notifying an IP address selected by the network device, and the packet content field is the selected IP address.

With reference to the third possible implementation of the second aspect, in a fifth possible implementation of the second aspect, the ICMPv6 message includes a type, code, and a packet content field, where the type indicates that a type of the ICMPv6 message is notifying an IP address not selected by the network device, the code indicates that a type of the packet content field is notifying that the first IP address is not selected by the network device, and the packet content field is the first IP address, or the packet content field is an indication indicating that the first IP address is not selected by the network device, or the packet content field is the packet.

According to a third aspect, a network device is provided, where the network device stores information, the information includes a correspondence between a link-layer address and an Internet Protocol IP address that are of a terminal device, the information is used to guide the network device to process a packet that is from the terminal device, and the network device includes:

an obtaining unit, configured to obtain a first link-layer address;

a first determining unit, configured to determine whether a quantity of IP addresses corresponding to the first link-layer address in the information reaches a threshold, where the threshold indicates a maximum quantity of IP addresses that are corresponding to the first link-layer address and that can be stored in the network device;

a selection unit, configured to: if the first determining unit determines that the quantity of IP addresses corresponding to the first link-layer address in the information reaches the threshold, select an IP address from the IP addresses corresponding to the first link-layer address, where a quantity of selected IP addresses is not greater than the maximum quantity;

a saving unit, configured to save a correspondence between the first link-layer address and the selected IP address; and a sending unit, configured to send, according to the selected IP address, a message to a terminal device having the first link-layer address, where the message is used to notify the terminal device having the first link-layer address whether an IP address is selected by the network device.

With reference to the third aspect, in a first possible implementation of the third aspect, the obtaining unit is specifically configured to obtain the first link-layer address from the information;

the selection unit is specifically configured to select the IP address from the IP addresses corresponding to the first link-layer address in the information; and the first determining unit is specifically configured to: when the quantity of IP addresses corresponding to the first link-layer address in the information is greater than the threshold, determine that the quantity of IP addresses corresponding to the first link-layer address in the information reaches the threshold, where the threshold is the maximum quantity.

With reference to the third aspect, in a second possible implementation of the third aspect, the obtaining unit is specifically configured to receive a packet sent by the terminal device having the first link-layer address, where the packet includes the first link-layer address and a first IP address; and the selection unit is specifically configured to select an IP address from the IP addresses corresponding to the first link-layer address in the information and the first IP address.

With reference to the second possible implementation of the third aspect, in a third possible implementation of the third aspect, the first determining unit is specifically configured to: when the quantity of IP addresses corresponding to the first link-layer address in the information is greater than the threshold, determine that the quantity of IP addresses corresponding to the first link-layer address in the information reaches the threshold, where the threshold is obtained by subtracting 1 from the maximum quantity; or the first determining unit is specifically configured to: when the quantity of IP addresses corresponding to the first link-layer address in the information is not less than the threshold, determine that the quantity of IP addresses corresponding to the first link-layer address in the information reaches the threshold, where the threshold is the maximum quantity.

With reference to the second or the third possible implementation of the third aspect, in a fourth possible implementation of the third aspect, a second determining unit is configured to: before the first determining unit determines whether the quantity of IP addresses corresponding to the first link-layer address in the information reaches the threshold, determine whether the information includes a correspondence between the first link-layer address and the first IP address; and the first determining unit is specifically configured to: when the second determining unit determines that the information does not include the correspondence between the first link-layer address and the first IP address, determine whether the quantity of IP addresses corresponding to the first link-layer address in the information reaches the threshold.

With reference to any one of the third aspect, or the first to the fourth possible implementations of the third aspect, in a fifth possible implementation of the third aspect, the sending unit is specifically configured to send the message to the terminal device having the first link-layer address, where the message is an RA message or an NA message, the message includes an option field, and the option field is used to carry the selected IP address.

With reference to the fifth possible implementation of the third aspect, in a sixth possible implementation of the third aspect, the option field includes a type, a length, and a value, where the type indicates that a type of the option field is notifying an IP address selected by the network device, the length indicates a length of the option field, and the value is the selected IP address.

With reference to any one of the third aspect, or the first to the fourth possible implementations of the third aspect, in a seventh possible implementation of the third aspect, the sending unit is specifically configured to send the message to the terminal device having the first link-layer address, where the message is an ICMPv6 message, and the message notifies the terminal device having the first link-layer address whether an IP address is selected by the network device.

With reference to the seventh possible implementation of the third aspect, in an eighth possible implementation of the third aspect, the ICMPv6 message includes a type, code, and a packet content field, where the type indicates that a type of the ICMPv6 message is notifying an IP address selected by the network device, the code indicates that a type of the packet content field is notifying an IP address selected by the network device, and the packet content field is the selected IP address.

With reference to the seventh possible implementation of the third aspect, in a ninth possible implementation of the third aspect, the ICMPv6 message includes a type, code, and a packet content field, where the type indicates that a type of the ICMPv6 message is notifying an IP address not selected by the network device, the code indicates that a type of the packet content field is notifying that the first IP address is not selected by the network device, and the packet content field is the first IP address, or the packet content field is an indication indicating that the first IP address is not selected by the network device, or the packet content field is the packet.

According to a fourth aspect, a terminal device is provided, where the terminal device has a link-layer address, and the terminal device includes:

a receiving unit, configured to receive a message sent by a network device, where the message is used to notify the terminal device whether an IP address is selected by the network device, and the message carries the link-layer address;

a determining unit, configured to determine, according to the message, an IP address selected by the network device, where the selected IP address is corresponding to the link-layer address; and a sending unit, configured to send a packet to the network device, where a source IP address of the packet is the IP address selected by the network device, and a source link-layer address of the packet is the link-layer address.

With reference to the fourth aspect, in a first possible implementation of the fourth aspect, the receiving unit is specifically configured to receive an RA message or an NA message that is sent by the network device, the message includes an option field, and the option field is used to carry the selected IP address.

With reference to the first possible implementation of the fourth aspect, in a second possible implementation of the fourth aspect, the option field includes a type, a length, and a value, where the type indicates that a type of the option field is notifying an IP address selected by the network device, the length indicates a length of the option field, and the value is the selected IP address.

With reference to the fourth aspect, in a third possible implementation of the fourth aspect, the receiving unit is specifically configured to receive an ICMPv6 message sent by the network device, and the message notifies the terminal device whether an IP address is selected by the network device.

With reference to the third possible implementation of the fourth aspect, in a fourth possible implementation of the fourth aspect, the ICMPv6 message includes a type, code, and a packet content field, where the type indicates that a type of the ICMPv6 message is notifying an IP address selected by the network device, the code indicates that a type of the packet content field is notifying an IP address selected by the network device, and the packet content field is the selected IP address.

With reference to the third possible implementation of the fourth aspect, in a fifth possible implementation of the fourth aspect, the ICMPv6 message includes a type, code, and a packet content field, where the type indicates that a type of the ICMPv6 message is notifying an IP address not selected by the network device, the code indicates that a type of the packet content field is notifying that the first IP address is not selected by the network device, and the packet content field is the first IP address, or the packet content field is an indication indicating that the first IP address is not selected by the network device, or the packet content field is the packet.

According to a fifth aspect, a network device is provided, where the network device stores information, the information includes a correspondence between a link-layer address and an Internet Protocol IP address that are of a terminal device, the information is used to guide the network device to process a packet that is from the terminal device, and the network device includes a processor and a memory.

The memory is configured to store a program instruction and data.

The processor is configured to read the program instruction and the data that are stored in the memory to perform the following operations:

obtaining, by the processor, a first link-layer address;

determining, by the processor, whether a quantity of IP addresses corresponding to the first link-layer address in the information reaches a threshold, where the threshold indicates a maximum quantity of IP addresses that are corresponding to the first link-layer address and that can be stored in the network device;

if the quantity of IP addresses corresponding to the first link-layer address in the information reaches the threshold, selecting, by the processor, an IP address from the IP addresses corresponding to the first link-layer address, where a quantity of selected IP addresses is not greater than the maximum quantity;

saving, by the processor, a correspondence between the first link-layer address and the selected IP address; and sending, by the processor according to the selected IP address, a message to a terminal device having the first link-layer address, where the message is used to notify the terminal device having the first link-layer address whether an IP address is selected by the network device.

With reference to the fifth aspect, in a first possible implementation of the fifth aspect, the obtaining, by the processor, a first link-layer address includes: obtaining, by the processor, the first link-layer address from the information.

Correspondingly, the selecting, by the processor, an IP address from the IP addresses corresponding to the first link-layer address includes: selecting, by the processor, the IP address from the IP addresses corresponding to the first link-layer address in the information.

The threshold is the maximum quantity, and that the quantity of IP addresses corresponding to the first link-layer address in the information reaches the threshold includes: the quantity of IP addresses corresponding to the first link-layer address in the information is greater than the threshold.

With reference to the fifth aspect, in a second possible implementation of the fifth aspect, the obtaining, by the processor, a first link-layer address includes: receiving, by the processor, a packet sent by the terminal device having the first link-layer address, where the packet includes the first link-layer address and a first IP address.

Correspondingly, the selecting, by the processor, an IP address from the IP addresses corresponding to the first link-layer address includes: selecting, by the processor, an IP address from the IP addresses corresponding to the first link-layer address in the information and the first IP address.

With reference to the second possible implementation of the fifth aspect, in a third possible implementation of the fifth aspect, the threshold is obtained by subtracting 1 from the maximum quantity, and that the quantity of IP addresses corresponding to the first link-layer address in the information reaches the threshold includes: the quantity of IP addresses corresponding to the first link-layer address in the information is greater than the threshold; or the threshold is the maximum quantity, and that the quantity of IP addresses corresponding to the first link-layer address in the information reaches the threshold includes:

the quantity of IP addresses corresponding to the first link-layer address in the information is not less than the threshold.

With reference to the second or the third possible implementation of the fifth aspect, in a fourth possible implementation of the fifth aspect, before the determining, by the processor, whether a quantity of IP addresses corresponding to the first link-layer address in the information reaches a threshold, the processor further performs the following operations:

determining, by the processor, whether the information includes a correspondence between the first link-layer address and the first IP address; and the determining, by the processor, whether a quantity of IP addresses corresponding to the first link-layer address in the information reaches a threshold is performed when it is determined that the information does not include the correspondence between the first link-layer address and the first IP address.

With reference to any one of the fifth aspect, or the first to the fourth possible implementations of the fifth aspect, in a fifth possible implementation of the fifth aspect, the message sent by the processor to the terminal device having the first link-layer address is an RA message or an NA message, the message includes an option field, and the option field is used to carry the selected IP address.

With reference to the fifth possible implementation of the fifth aspect, in a sixth possible implementation of the fifth aspect, the option field includes a type, a length, and a value, where the type indicates that a type of the option field is notifying an IP address selected by the network device, the length indicates a length of the option field, and the value is the selected IP address.

With reference to any one of the fifth aspect, or the first to the fourth possible implementations of the fifth aspect, in a seventh possible implementation of the fifth aspect, the message sent by the processor to the terminal device having the first link-layer address is an ICMPv6 message, and the message notifies the terminal device having the first link-layer address whether an IP address is selected by the network device.

With reference to the seventh possible implementation of the fifth aspect, in an eighth possible implementation of the fifth aspect, the ICMPv6 message includes a type, a code, and a packet content field, where the type indicates that a type of the ICMPv6 message is notifying an IP address selected by the network device, the code indicates that a type of the packet content field is notifying an IP address selected by the network device, and the packet content field is the selected IP address.

With reference to the seventh possible implementation of the fifth aspect, in a ninth possible implementation of the fifth aspect, the ICMPv6 message includes a type, a code, and a packet content field, where the type indicates that a type of the ICMPv6 message is notifying an IP address not selected by the network device, the code indicates that a type of the packet content field is notifying that the first IP address is not selected by the network device, and the packet content field is the first IP address, or the packet content field is an indication indicating that the first IP address is not selected by the network device, or the packet content field is the packet.

According to a sixth aspect, a terminal device is provided, where the terminal device has a link-layer address, and the terminal device includes a processor and a memory.

The memory is configured to store a program instruction and data.

The processor is configured to read the program instruction and the data that are stored in the memory to perform the following operations:

receiving, by the processor, a message sent by a network device, where the message is used to notify the terminal device whether an IP address is selected by the network device, and the message carries the link-layer address;

determining, by the processor according to the message, an IP address selected by the network device, where the selected IP address is corresponding to the link-layer address; and sending, by the processor, a packet to the network device, where a source IP address of the packet is the IP address selected by the network device, and a source link-layer address of the packet is the link-layer address.

With reference to the sixth aspect, in a first possible implementation of the sixth aspect, the message received by the processor is an RA message or an NA message, the message includes an option field, and the option field is used to carry the selected IP address.

With reference to the first possible implementation of the sixth aspect, in a second possible implementation of the sixth aspect, the option field includes a type, a length, and a value, where the type indicates that a type of the option field is notifying an IP address selected by the network device, the length indicates a length of the option field, and the value is the selected IP address.

With reference to the sixth aspect, in a third possible implementation of the sixth aspect, the message received by the processor is an ICMPv6 message, and the message notifies the terminal device whether an IP address is selected by the network device.

With reference to the third possible implementation of the sixth aspect, in a fourth possible implementation of the sixth aspect, the ICMPv6 message includes a type, a code, and a packet content field, where the type indicates that a type of the ICMPv6 message is notifying an IP address selected by the network device, the code indicates that a type of the packet content field is notifying an IP address selected by the network device, and the packet content field is the selected IP address.

With reference to the third possible implementation of the sixth aspect, in a fifth possible implementation of the sixth aspect, the ICMPv6 message includes a type, a code, and a packet content field, where the type indicates that a type of the ICMPv6 message is notifying an IP address not selected by the network device, the code indicates that a type of the packet content field is notifying that the first IP address is not selected by the network device, and the packet content field is the first IP address, or the packet content field is an indication indicating that the first IP address is not selected by the network device, or the packet content field is the packet.

According to the method for communication between a network device and a terminal device, the network device, and the terminal device in the embodiments of the present disclosure, a network device uses a first link-layer address as a processing object; when a quantity of IP addresses corresponding to the first link-layer address in information stored in the network device reaches a threshold, selects, according to the threshold, an IP address from the IP addresses corresponding to the first link-layer address; and saves a correspondence between the first link-layer address and the selected IP address. In this way, a problem that a cache of a network device is insufficient may be effectively relieved, and a loss of a data packet in a process of communication between a network device and a terminal device may be reduced by notifying the terminal device of an IP address selection result.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

In order to enable a person skilled in the art to better understand the solutions in the embodiments of the present disclosure, the following describes the embodiments of the present disclosure in more detail with reference to accompanying drawings and implementations.

As network technologies continuously develop, a network device needs to store, for more terminal devices, a correspondence between a link-layer address and an IP address, so as to process a packet that is from the terminal device by using the correspondence between a link-layer address and an IP address. For example, after a network is extended, more terminal devices are allowed to connect to a network device; or a network device in a large Layer-2 network is moved up and deployed on an aggregation layer or even on a core layer; or a terminal device is a dual stack device that can support both IPv4 and IPv6; or the like. As a result, much cache space of a network device is consumed, and the network device is severely restricted in storing, for more terminal devices, a correspondence between a link-layer address and an IP address. Solutions of the embodiments of the present disclosure are proposed to effectively relieve a problem that cache space of a network device is insufficient and reduce a loss of a data packet in a process of communication between a network device and a terminal device.

Figure 1:
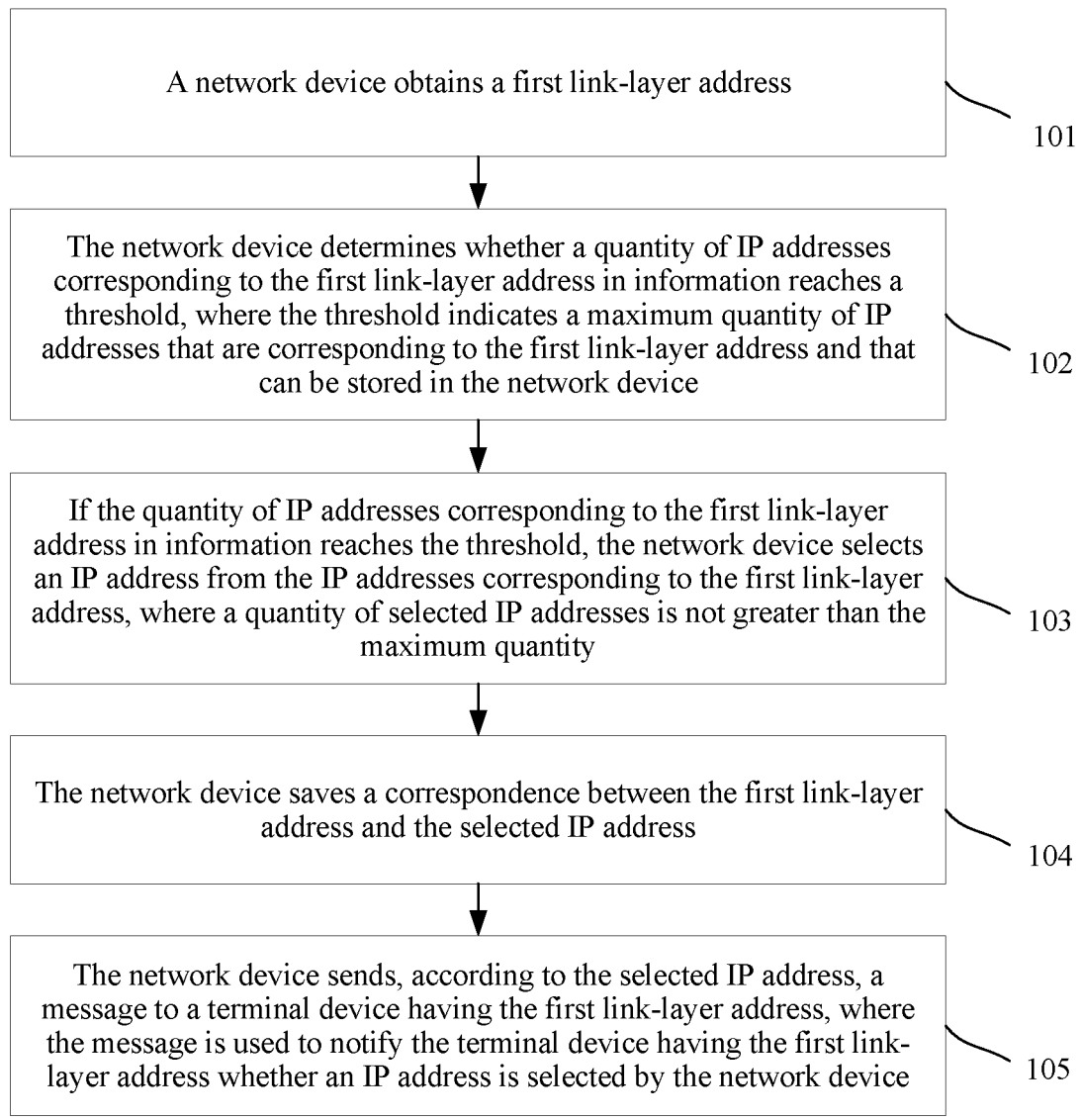
FIG. 1 is a flowchart of a method for communication between a network device and a terminal device according to an embodiment of the present disclosure.

Referring to FIG. 1, FIG. 1 shows a method for communication between a network device and a terminal device according to an embodiment of the present disclosure. The network device may store information. The information includes a correspondence between a link-layer address and an IP address that are of the terminal device, and the information is used to guide the network device to process a packet that is from the terminal device. The method may include the following steps.

101. The network device obtains a first link-layer address.

For example, the network device in this embodiment of the present disclosure may be a device, such as a router or a switch, that can forward a packet by using the correspondence between a link-layer address and an IP address.

For example, the terminal device in this embodiment of the present disclosure may have at least two IP addresses. A terminal device that supports IPv6 is used as an example, and a link-layer address of the terminal device may be corresponding to the following three IP addresses: a Dynamic Host Configuration Protocol for IPv6 (DHCPv6) address, a temporary address, and an automatic configuration address.

When cache space of the network device is cleared by using the solutions of the embodiments of the present disclosure, the link-layer address may be used as a basic processing unit. Therefore, the network device may first obtain the first link-layer address, and then clear a correspondence for the first link-layer address with reference to a subsequent solution provided in this embodiment of the present disclosure.

For example, in this embodiment of the present disclosure, the network device may obtain the first link-layer address in at least the following two manners.

Manner 1: The network device obtains the first link-layer address from the information stored in the network device. That is, the network device may select one link-layer address from the locally stored correspondence between a link-layer address and an IP address as the first link-layer address.

For example, when being triggered by an external signal, the network device may obtain the first link-layer address from the information; or when being triggered by an internal signal, the network device may obtain the first link-layer address from the information. The external signal may be an external trigger signal manually entered by a person, or the external signal may be an external trigger signal entered by using a device. The internal signal may be a periodic trigger signal that is set in the network device, or the internal signal may be a conditional trigger signal that is set in the network device. For example, the conditional trigger signal may be a signal that is sent after the network device executes a specified action; or the conditional trigger signal may be a signal that is sent when usage of the cache space of the network device is greater than preset usage; or the conditional trigger signal may be a signal that is sent when an increasing speed of the network device in storing the correspondence between a link-layer address and an IP address is greater than a preset increasing speed. This embodiment of the present disclosure may impose no specific limitation on a manner of triggering the network device to obtain the first link-layer address, a specific presentation form of a trigger signal, and the like.

Manner 2: The network device receives a packet sent by a terminal device having the first link-layer address. The packet includes the first link-layer address and a first IP address. That is, the network device may obtain the first link-layer address from the packet sent by the terminal device having the first link-layer address.

For example, the packet that is sent by the terminal device having the first link-layer address to the network device may be a dedicated packet; or the packet may be any data packet for communication from the terminal device to the network device; or the packet may be a Neighbor Discovery (ND) Protocol message. For example, the packet may be specifically a router solicitation (RS) message or a neighbor solicitation (NS) message in the ND message. This embodiment of the present disclosure may impose no specific limitation thereto.

For example, the terminal device having the first link-layer address may send the packet to the network device at a neighbor discovery stage; or the terminal device having the first link-layer address may send the packet to the network device at an external communication stage. This embodiment of the present disclosure may impose no specific limitation thereto.

It should be noted that the packet sent by the terminal device to the network device in manner 2 may also be referred to as an external trigger signal entered by using a device. However, different from the trigger signal in manner 1, the packet in manner 2 carries the first link-layer address and the first IP address.

102. The network device determines whether a quantity of IP addresses corresponding to the first link-layer address in the information reaches a threshold, where the threshold indicates a maximum quantity of IP addresses that are corresponding to the first link-layer address and that can be stored in the network device.

103. If the quantity of IP addresses corresponding to the first link-layer address in the information reaches the threshold, the network device selects an IP address from the IP addresses corresponding to the first link-layer address, where a quantity of selected IP addresses is not greater than the maximum quantity.

After obtaining the first link-layer address, the network device may determine, with reference to the quantity of IP addresses corresponding to the first link-layer address in the locally stored information and the preset threshold, whether the correspondence needs to be cleared currently. If the quantity of IP addresses corresponding to the first link-layer address does not reach the threshold, the network device may determine that the correspondence does not need to be cleared currently; or if the quantity of IP addresses corresponding to the first link-layer address reaches the threshold, the network device may determine that the correspondence needs to be cleared currently. Specifically, the network device may select, according to the threshold, the IP address from all the IP addresses corresponding to the first link-layer address, and ensure that the quantity of selected IP addresses does not exceed the maximum quantity. In this way, the maximum quantity of IP addresses that are corresponding to the first link-layer address and that can be stored in the network device is set, and the correspondence is cleared accordingly, so that a problem that the cache space of the network device is insufficient may be effectively relieved.

For example, with reference to the two manners of obtaining the first link-layer address by the network device, the network device may determine a threshold and select an IP address in the following manners.

Manner 1:

Corresponding to manner 1 of obtaining the first link-layer address by the network device, the IP addresses corresponding to the first link-layer address include the IP addresses corresponding to the first link-layer address in the information locally stored in the network device. That is, an IP address is selected from the IP addresses corresponding to the first link-layer address in the information locally stored in the network device, to obtain the selected IP address.

Correspondingly, the network device may determine the maximum quantity of IP addresses, that are corresponding to the first link-layer address and that can be stored, as the threshold. That is, Threshold=Maximum quantity. Therefore, that the quantity of IP addresses corresponding to the first link-layer address reaches the threshold includes: the quantity of IP addresses corresponding to the first link-layer address in the information locally stored in the network device is greater than the threshold.

For example, if Threshold=Maximum quantity=3, and the quantity of IP addresses corresponding to the first link-layer address in the information locally stored in the network device is 4, the network device may determine accordingly that the quantity reaches the threshold, and select three IP addresses from the four IP addresses as the selected IP addresses.

Manner 2:

Corresponding to manner 2 of obtaining the first link-layer address by the network device, the IP addresses corresponding to the first link-layer address include the IP addresses corresponding to the first link-layer address in the information locally stored in the network device and the first IP address included in the packet. That is, an IP address is selected from the IP addresses corresponding to the first link-layer address in the information locally stored in the network device and the first IP address, to obtain the selected IP address.

Correspondingly, the network device may determine the maximum quantity as the threshold. That is, Threshold=Maximum quantity. Therefore, that the quantity of IP addresses corresponding to the first link-layer address reaches the threshold includes: the quantity of IP addresses corresponding to the first link-layer address in the information locally stored in the network device is not less than the threshold.

For example, if Threshold=Maximum quantity=3, the quantity of IP addresses corresponding to the first link-layer address in the information locally stored in the network device is 3, a quantity of IP addresses corresponding to the first link-layer address in the packet is 1, and an IP address in the packet is different from an IP address in the information, the four IP addresses corresponding to the first link-layer address exceed the threshold, and the network device may determine accordingly that the quantity reaches the threshold, and select three IP addresses from the four IP addresses as the selected IP addresses.

Alternatively, the network device may determine a value that is obtained by subtracting 1 from the maximum quantity as the threshold. That is, Threshold=Maximum quantity−1. Therefore, that the quantity of IP addresses corresponding to the first link-layer address reaches the threshold includes: the quantity of IP addresses corresponding to the first link-layer address in the information locally stored in the network device is less than the threshold.

For example, if Threshold=Maximum quantity−1=3−1=2, the quantity of IP addresses corresponding to the first link-layer address in the information locally stored in the network device is 2, and a quantity of IP addresses corresponding to the first link-layer address in the packet is 1, the three IP addresses corresponding to the first link-layer address do not exceed the maximum quantity, the network device may determine accordingly that the quantity does not reach the threshold, and the correspondence does not need to be cleared. For example, if the quantity of IP addresses corresponding to the first link-layer address in the information locally stored in the network device is 4, and a quantity of IP addresses corresponding to the first link-layer address in the packet is 1, the five IP addresses corresponding to the first link-layer address exceed the maximum quantity, and the network device may determine accordingly that the quantity reaches the threshold, and select three IP addresses from the five IP addresses as the selected IP addresses.

For example, when determining that the quantity of IP addresses corresponding to the first link-layer address in the information reaches the threshold, the network device may select an IP address in at least the following three manners.

Manner 1: The network device obtains, according to a priority of an IP address, an order of priorities of IP addresses corresponding to the first link-layer address; and the network device obtains, in descending order of the priorities, the selected IP address from the order according to the maximum quantity. That is, an IP address with a relatively high priority and meeting a requirement on the maximum quantity is used as the selected IP address.

Manner 2: The network device obtains, according to a storage time of an IP address, an order of storage times of IP addresses corresponding to the first link-layer address; and the network device obtains, in chronological order of the storage times, the selected IP address from the order according to the maximum quantity. That is, an IP address with a relatively long storage time and meeting a requirement on the maximum quantity is used as the selected IP address.

Manner 3: The network device obtains, according to a storage time of an IP address, an order of storage times of IP addresses corresponding to the first link-layer address; and the network device obtains, in reverse chronological order of the storage times, the selected IP address from the order according to the maximum quantity. That is, an IP address with a relatively short storage time and meeting a requirement on the maximum quantity is used as the selected IP address.

104. The network device saves a correspondence between the first link-layer address and the selected IP address.

The network device obtains the selected IP address by using the threshold, and may save the correspondence between the first link-layer address and the selected IP address. Specifically, the network device saves the correspondence between the first link-layer address and the selected IP address in local information.

Optionally, if the selected IP address does not include the first IP address, in this embodiment of the present disclosure, the saving a correspondence between the first link-layer address and the selected IP address includes: deleting a correspondence, between the first link-layer address and an unselected IP address, in the information locally stored in the network device. For example, the IP addresses corresponding to the first link-layer address include: an IP 1, an IP 2, an IP 3, and an IP 4 that are corresponding to the first link-layer address in the information, and an IP 5 corresponding to the first link-layer address in the packet. If the selected IP addresses are the IP 1, IP 2, and IP 3, the saving a correspondence between the first link-layer address and the selected IP address includes: deleting a correspondence between the first link-layer address and the IP 4 in the information, so that the network device saves a correspondence between the first link-layer address and the IP 1, a correspondence between the first link-layer address and the IP 2, and a correspondence between the first link-layer address and the IP 3.

Optionally, if the selected IP address includes the first IP address, in this embodiment of the present disclosure, the saving a correspondence between the first link-layer address and the selected IP address includes: deleting a correspondence, between the first link-layer address and an unselected IP address, in the information locally stored in the network device; and establishing a correspondence between the first link-layer address and the first IP address and saving the correspondence in the information. For example, the IP addresses corresponding to the first link-layer address include: an IP 1, an IP 2, an IP 3, and an IP 4 that are corresponding to the first link-layer address in the information, and an IP 5 corresponding to the first link-layer address in the packet. If the selected IP addresses are the IP 1, IP 2, and IP 5, the saving a correspondence between the first link-layer address and the selected IP address includes: deleting a correspondence between the first link-layer address and the IP 3 in the information; deleting a correspondence between the first link-layer address and the IP 4; and adding a correspondence between the first link-layer address and the IP 5 to the information, so that the network device saves a correspondence between the first link-layer address and the IP 1, a correspondence between the first link-layer address and the IP 2, and the correspondence between the first link-layer address and the IP 5.

105. The network device sends, according to the selected IP address, a message to a terminal device having the first link-layer address, where the message is used to notify the terminal device having the first link-layer address whether an IP address is selected by the network device.

In this embodiment of the present disclosure, the selected IP address is determined from the IP addresses corresponding to the first link-layer address, and the correspondence between the first link-layer address and the selected IP address is saved, so that a problem that a cache of a network device is insufficient may be effectively relieved, and a loss of a data packet in a process of communication between a network device and a terminal device may be reduced by notifying the terminal device of an IP address selection result.

Optionally, this embodiment of the present disclosure imposes no specific limitation on an execution order of 104 and 105. The network device may first perform 104 and then perform 105, as shown in FIG. 1; or may first perform 105 and then perform 104, or may perform 104 and 105 at the same time.

For example, the message sent by the network device to the terminal device having the first link-layer address may be presented in at least the following manners.

Manner 1:

The message sent by the network device to the terminal device having the first link-layer address may be a router advertisement (RA) message or a neighbor advertisement (NA) message. That is, an option field in the RA message or the NA message is extended, so that the option field carries the selected IP address.

Figure 2:
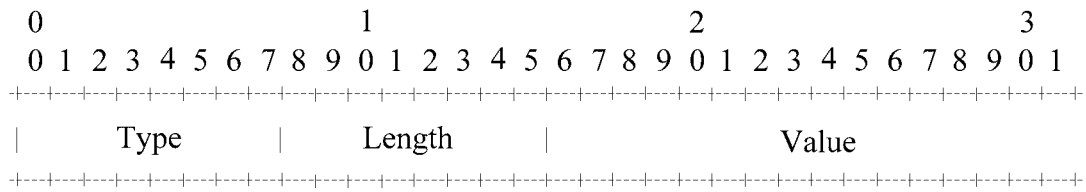
FIG. 2 is a schematic diagram of a first message format according to an embodiment of the present disclosure.

With reference to a schematic diagram of a message format shown in FIG. 2, the option field may include a type (Type), a length (Length), and a value (Value). The type indicates that a type of the option field is notifying an IP address selected by the network device, the length indicates a length of the option field, and the value is the selected IP address. Optionally, the value may be all IP addresses included in the selected IP addresses, or the value may be a part of IP addresses included in the selected IP addresses. This embodiment of the present disclosure may impose no specific limitation thereto.

It should be noted that, corresponding to manner 1 of obtaining the first link-layer address by the network device, the notifying whether an IP address is selected by the network device includes: notifying whether the IP addresses corresponding to the first link-layer address in the information locally stored in the network device are selected by the network device.

Corresponding to manner 2 of obtaining the first link-layer address by the network device, the notifying whether an IP address is selected by the network device includes: notifying whether the IP addresses corresponding to the first link-layer address in the information locally stored in the network device and the first IP address included in the packet are selected by the network device.

Manner 2:

The message sent by the network device to the terminal device having the first link-layer address is an RA message or an NA message. That is, an option field in the RA message or the NA message is extended, so that the option field carries an unselected IP address.

With reference to a schematic diagram of a message format shown in FIG. 2, the option field may include a type, a length, and a value. The type indicates that a type of the option field is notifying an IP address not selected by the network device, the length indicates a length of the option field, and the value is the IP address not selected by the network device.

It should be noted that, for a specific meaning of the notifying whether an IP address is selected by the network device, refer to the description of the foregoing manner 1. Details are not described herein.

Manner 3:

The network device responds to an RS message sent by the terminal device having the first link-layer address, and notifies, by using an RA message, the terminal device having the first link-layer address that the first IP address is selected; or the network device responds to an NS message sent by the terminal device having the first link-layer address, and notifies, by using an NA message, the terminal device having the first link-layer address that the first IP address is selected. Specifically, an option field in the RA message or the NA message may be extended, so that the option field notifies that the first IP address is selected by the network device, that is, the selected IP address includes the first IP address.

With reference to a schematic diagram of a message format shown in FIG. 2, the option field may include a type, a length, and a value. The type indicates that a type of the option field is notifying an IP address selected by the network device, the length indicates a length of the option field, and the value is the first IP address, or the value is an indication indicating that the first IP address is selected by the network device.

It should be noted that the notifying whether an IP address is selected by the network device includes: notifying whether the first IP address is selected by the network device.

Manner 4:

The network device responds to an RS message sent by the terminal device having the first link-layer address, and notifies, by using an RA message, the terminal device having the first link-layer address that the first IP address is not selected; or the network device responds to an NS message sent by the terminal device having the first link-layer address, and notifies, by using an NA message, the terminal device having the first link-layer address that the first IP address is not selected. Specifically, an option field in the RA message or the NA message may be extended, so that the option field notifies that the first IP address is not selected by the network device, that is, the selected IP address does not include the first IP address.

With reference to a schematic diagram of a message format shown in FIG. 2, the option field may include a type, a length, and a value. The type indicates that a type of the option field is notifying an IP address not selected by the network device, the length indicates a length of the option field, and the value is the first IP address, or the value is an indication indicating that the first IP address is not selected by the network device.

It should be noted that the notifying whether an IP address is selected by the network device includes: notifying whether the first IP address is selected by the network device.

Manner 5:

The message sent by the network device to the terminal device having the first link-layer address may be an Internet Control Message Protocol version 6 (ICMPv6) message. That is, the ICMPv6 message is extended, so that the message notifies an IP address selected by the network device.

Figure 3:
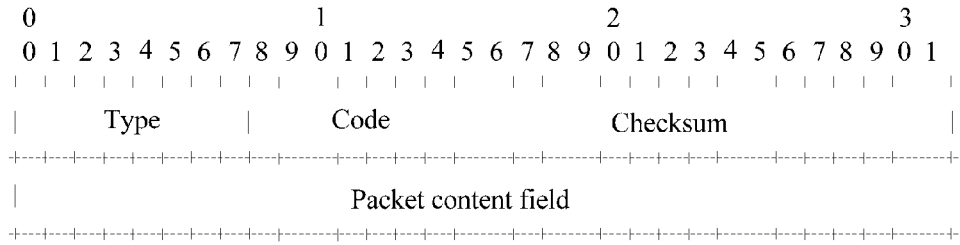
FIG. 3 is a schematic diagram of a second message format according to an embodiment of the present disclosure.

With reference to a schematic diagram of a message format shown in FIG. 3, the ICMPv6 message includes a type, code (Code), and a packet content field. The type indicates that a type of the ICMPv6 message is notifying an IP address selected by the network device, the code indicates that a type of the packet content field is notifying an IP address selected by the network device, and the packet content field is the selected IP address. Optionally, the packet content field may be all IP addresses included in the selected IP addresses, or the packet content field may be a part of IP addresses included in the selected IP addresses. This embodiment of the present disclosure may impose no specific limitation thereto.

It should be noted that, corresponding to manner 1 of obtaining the first link-layer address by the network device, the notifying whether an IP address is selected by the network device includes: notifying whether the IP addresses corresponding to the first link-layer address in the information locally stored in the network device are selected by the network device.

Corresponding to manner 2 of obtaining the first link-layer address by the network device, the notifying whether an IP address is selected by the network device includes: notifying whether the IP addresses corresponding to the first link-layer address in the information locally stored in the network device and the first IP address included in the packet are selected by the network device.

Manner 6:

The message sent by the network device to the terminal device having the first link-layer address may be an ICMPv6 message. That is, the ICMPv6 message is extended, so that the message notifies an IP address not selected by the network device.

With reference to a schematic diagram of a message format shown in FIG. 3, the ICMPv6 message includes a type, code, and a packet content field. The type indicates that a type of the ICMPv6 message is notifying an IP address not selected by the network device, the code indicates that a type of the packet content field is notifying an IP address not selected by the network device, and the packet content field is the IP address not selected by the network device.

It should be noted that, for a specific meaning of the notifying whether an IP address is selected by the network device, refer to the description of the foregoing manner 1. Details are not described herein.

Manner 7:

The network device responds to the packet sent by the terminal device having the first link-layer address, and notifies, by using an ICMPv6 message, the terminal device having the first link-layer address that the first IP address is selected. Specifically, the ICMPv6 message may be extended, so that the message notifies that the first IP address is selected by the network device, that is, the selected IP address includes the first IP address.

Figure 4:
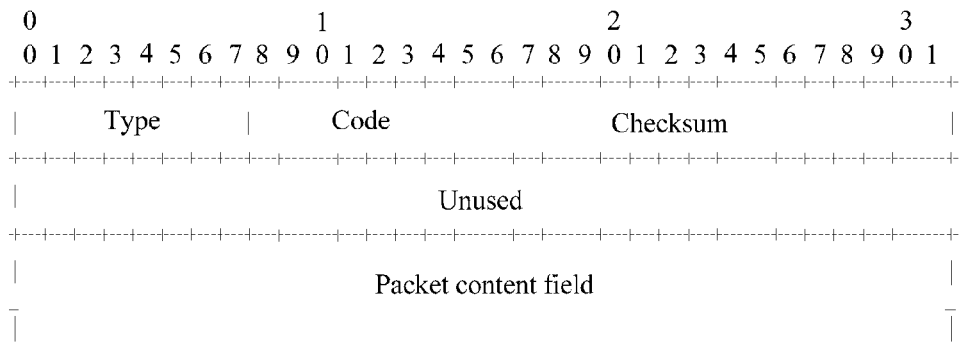
FIG. 4 is a schematic diagram of a third message format according to an embodiment of the present disclosure.

With reference to a schematic diagram of a message format shown in FIG. 4, the ICMPv6 message includes a type, code, and a packet content field. The type indicates that a type of the ICMPv6 message is notifying an IP address selected by the network device, the code indicates that a type of the packet content field is notifying an IP address selected by the network device, and the packet content field is the first IP address, or the packet content field is an indication indicating that the first IP address is selected by the network device.

It should be noted that the notifying whether an IP address is selected by the network device includes: notifying whether the first IP address is selected by the network device.

Manner 8:

The network device responds to the packet sent by the terminal device having the first link-layer address, and notifies, by using an ICMPv6 message, the terminal device having the first link-layer address that the first IP address is not selected. Specifically, the ICMPv6 message may be extended, so that the message notifies that the first IP address is not selected by the network device, that is, the selected IP address does not include the first IP address.

With reference to a schematic diagram of a message format shown in FIG. 4, the ICMPv6 message includes a type, code, and a packet content field. The type indicates that a type of the ICMPv6 message is notifying an IP address not selected by the network device, the code indicates that a type of the packet content field is notifying an IP address not selected by the network device, and the packet content field is the first IP address, or the packet content field is an indication indicating that the first IP address is not selected by the network device, or the packet content field is the packet.

It should be noted that the notifying whether an IP address is selected by the network device includes: notifying whether the first IP address is selected by the network device.

Optionally, based on the solution shown in FIG. 1, an embodiment of the present disclosure further provides a solution. Specifically, before the network device determines whether the quantity of IP addresses corresponding to the first link-layer address in the information reaches the threshold, this embodiment of the present disclosure further includes: determining, by the network device, whether the information includes a correspondence between the first link-layer address and the first IP address; and that the network device determines whether a quantity of IP addresses corresponding to the first link-layer address in the information reaches a threshold is performed when it is determined that the information does not include the correspondence between the first link-layer address and the first IP address.

Figure 5:
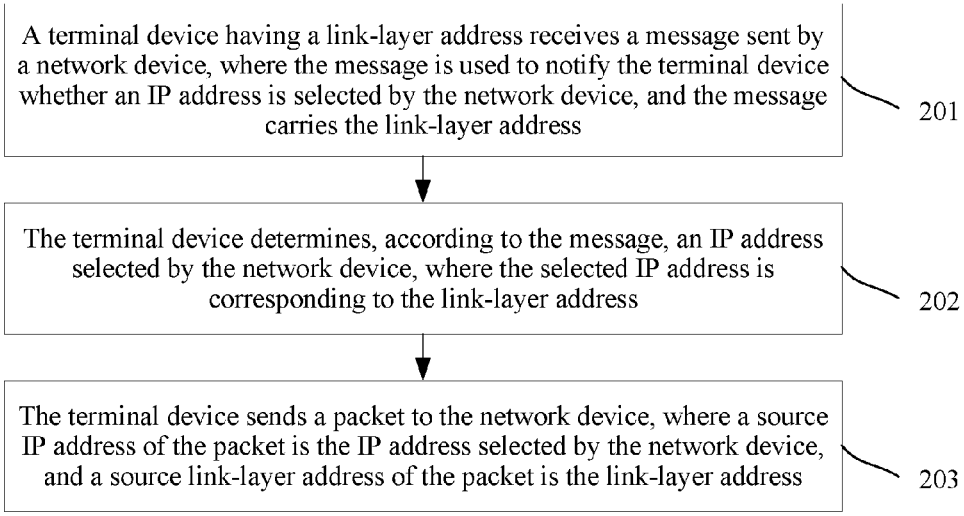
FIG. 5 is a flowchart of a method for communication between a terminal device and a network device according to an embodiment of the present disclosure.

Corresponding to the foregoing method shown in FIG. 1, an embodiment of the present disclosure further provides a method for communication between a terminal device and a network device. Referring to FIG. 5, the method may include the following steps.

201. A terminal device having a link-layer address receives a message sent by the network device, where the message is used to notify the terminal device whether an IP address is selected by the network device, and the message carries the link-layer address.

202. The terminal device determines, according to the message, an IP address selected by the network device, where the selected IP address is corresponding to the link-layer address.

After the network device clears a correspondence according to the solution shown in FIG. 1, to reduce a loss of a data packet in a process of communication between the network device and a terminal device, the network device further sends a message to a terminal device to which a cleared link-layer address belongs, and notifies, by using the message, the terminal device of an IP address selection result, that is, an IP address that is selected for the link-layer address by the network device and that has a correspondence to the link-layer address. Therefore, the terminal device may perform communication according to an indication of the message by using the IP address selected by the network device.

After receiving the message sent by the network device, the terminal device may perform the following processing according to a specific manner of the message.

If the message is presented in manner 1, manner 3, manner 5, or manner 7 described above, that is, the message is used to notify the terminal device of an IP address selected by the network device, correspondingly, the terminal device may determine an IP address that the message is specific to, and configure the IP address that the message is specific to, to be available relative to the link-layer address.

If the message is presented in manner 2, manner 4, manner 6, or manner 8 described above, that is, the message is used to notify the terminal device of an IP address not selected by the network device, correspondingly, the terminal device may determine an IP address that the message is specific to, and configure the IP address that the message is specific to, to be unavailable relative to the link-layer address.

203. The terminal device sends a packet to the network device, where a source IP address of the packet is the IP address selected by the network device, and a source link-layer address of the packet is the link-layer address.

By means of a message sent by a network device, a terminal device may learn that which IP address can be used as a source IP address when a link-layer address is used for external communication. Therefore, in a packet sent by the terminal device to the network device, the link-layer address may be determined as a source link-layer address, and an IP address in IP addresses that are configured to be available relative to the link-layer address is determined as the source IP address. In this way, after receiving the packet, the network device may process and forward the packet by using a locally stored correspondence between the link-layer address and an available IP address, so as to avoid a problem of a packet loss that is caused because the network device cannot process the packet correctly because the terminal device sends the packet to the network device by using an unavailable IP address.

Figure 6:
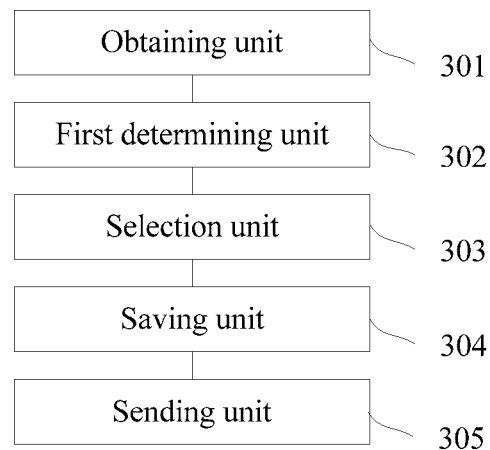
FIG. 6 is a schematic diagram of a network device according to an embodiment of the present disclosure.

Corresponding to the method shown in FIG. 1, an embodiment of the present disclosure further provides a network device. The network device stores information, the information includes a correspondence between a link-layer address and an Internet Protocol IP address that are of a terminal device, and the information is used to guide the network device to process a packet that is from the terminal device. Referring to a schematic diagram shown in FIG. 6, the network device may include:

an obtaining unit 301, configured to obtain a first link-layer address;

a first determining unit 302, configured to determine whether a quantity of IP addresses corresponding to the first link-layer address in the information reaches a threshold, where the threshold indicates a maximum quantity of IP addresses that are corresponding to the first link-layer address and that can be stored in the network device;

a selection unit 303, configured to: if the first determining unit determines that the quantity of IP addresses corresponding to the first link-layer address in the information reaches the threshold, select an IP address from the IP addresses corresponding to the first link-layer address, where a quantity of selected IP addresses is not greater than the maximum quantity;

a saving unit 304, configured to save a correspondence between the first link-layer address and the selected IP address; and a sending unit 305, configured to send, according to the selected IP address, a message to a terminal device having the first link-layer address, where the message is used to notify the terminal device having the first link-layer address whether an IP address is selected by the network device.

Optionally, the obtaining unit is specifically configured to obtain the first link-layer address from the information;

the selection unit is specifically configured to select the IP address from the IP addresses corresponding to the first link-layer address in the information; and the first determining unit is specifically configured to: when the quantity of IP addresses corresponding to the first link-layer address in the information is greater than the threshold, determine that the quantity of IP addresses corresponding to the first link-layer address in the information reaches the threshold, where the threshold is the maximum quantity.

Optionally, the obtaining unit is specifically configured to receive a packet sent by the terminal device having the first link-layer address, where the packet includes the first link-layer address and a first IP address; and the selection unit is specifically configured to select an IP address from the IP addresses corresponding to the first link-layer address in the information and the first IP address.

Optionally, the first determining unit is specifically configured to: when the quantity of IP addresses corresponding to the first link-layer address in the information is greater than the threshold, determine that the quantity of IP addresses corresponding to the first link-layer address in the information reaches the threshold, where the threshold is obtained by subtracting 1 from the maximum quantity; or the first determining unit is specifically configured to: when the quantity of IP addresses corresponding to the first link-layer address in the information is not less than the threshold, determine that the quantity of IP addresses corresponding to the first link-layer address in the information reaches the threshold, where the threshold is the maximum quantity.

Optionally, a second determining unit is configured to: before the first determining unit determines whether the quantity of IP addresses corresponding to the first link-layer address in the information reaches the threshold, determine whether the information includes a correspondence between the first link-layer address and the first IP address; and the first determining unit is specifically configured to: when the second determining unit determines that the information does not include the correspondence between the first link-layer address and the first IP address, determine whether the quantity of IP addresses corresponding to the first link-layer address in the information reaches the threshold.

Optionally, the sending unit is specifically configured to send the message to the terminal device having the first link-layer address. The message is an RA message or an NA message, the message includes an option field, and the option field is used to carry the selected IP address.

Optionally, the option field includes a type, a length, and a value. The type indicates that a type of the option field is notifying an IP address selected by the network device, the length indicates a length of the option field, and the value is the selected IP address.

Optionally, the sending unit is specifically configured to send the message to the terminal device having the first link-layer address. The message is an ICMPv6 message, and the message notifies the terminal device having the first link-layer address whether an IP address is selected by the network device.

Optionally, the ICMPv6 message includes a type, a code, and a packet content field. The type indicates that a type of the ICMPv6 message is notifying an IP address selected by the network device, the code indicates that a type of the packet content field is notifying an IP address selected by the network device, and the packet content field is the selected IP address.

Optionally, the ICMPv6 message includes a type, a code, and a packet content field. The type indicates that a type of the ICMPv6 message is notifying an IP address not selected by the network device, the code indicates that a type of the packet content field is notifying that the first IP address is not selected by the network device, and the packet content field is the first IP address, or the packet content field is an indication indicating that the first IP address is not selected by the network device, or the packet content field is the packet.

In the foregoing optional solution, for an additional function that may be implemented by the network device in the embodiment of the present disclosure, refer to the description of the additional function of the network device in the method embodiment. Details are not described herein.

In addition, when the network device provided in the foregoing embodiment communicates with a terminal device, division of the foregoing functional modules is merely used as an example for description. In an actual application, the foregoing functions may be allocated to different functional modules for implementation as required. That is, an internal structure of the network device is divided into different functional modules to implement all or a part of the functions described above.

Figure 7:
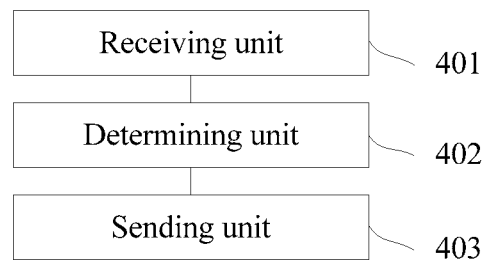
FIG. 7 is a schematic diagram of a terminal device according to an embodiment of the present disclosure.

Corresponding to the method shown in FIG. 5, an embodiment of the present disclosure further provides a terminal device, and the terminal device has a link-layer address. Referring to a schematic diagram shown in FIG. 7, the terminal device includes:

a receiving unit 401, configured to receive a message sent by a network device, where the message is used to notify the terminal device whether an IP address is selected by the network device, and the message carries the link-layer address;

a determining unit 402, configured to determine, according to the message, an IP address selected by the network device, where the selected IP address is corresponding to the link-layer address; and a sending unit 403, configured to send a packet to the network device, where a source IP address of the packet is the IP address selected by the network device, and a source link-layer address of the packet is the link-layer address.

Optionally, the receiving unit is specifically configured to receive an RA message or an NA message that is sent by the network device, the message includes an option field, and the option field is used to carry the selected IP address.

Optionally, the option field includes a type, a length, and a value. The type indicates that a type of the option field is notifying an IP address selected by the network device, the length indicates a length of the option field, and the value is the selected IP address.

Optionally, the receiving unit is specifically configured to receive an ICMPv6 message sent by the network device, and the message notifies the terminal device whether an IP address is selected by the network device.

Optionally, the ICMPv6 message includes a type, a code, and a packet content field. The type indicates that a type of the ICMPv6 message is notifying an IP address selected by the network device, the code indicates that a type of the packet content field is notifying an IP address selected by the network device, and the packet content field is the selected IP address.

Optionally, the ICMPv6 message includes a type, a code, and a packet content field. The type indicates that a type of the ICMPv6 message is notifying an IP address not selected by the network device, the code indicates that a type of the packet content field is notifying that the first IP address is not selected by the network device, and the packet content field is the first IP address, or the packet content field is an indication indicating that the first IP address is not selected by the network device, or the packet content field is the packet.

In the foregoing optional solution, for an additional function that may be implemented by the terminal device in the embodiment of the present disclosure, refer to the description of the additional function of the terminal device in the method embodiment. Details are not described herein.

In addition, when the terminal device provided in the foregoing embodiment communicates with a network device, division of the foregoing functional modules is merely used as an example for description. In an actual application, the foregoing functions may be allocated to different functional modules for implementation as required. That is, an internal structure of the terminal device is divided into different functional modules to implement all or a part of the functions described above.

Corresponding to the method shown in FIG. 4, an embodiment of the present disclosure further provides a network device 500. The network device stores information, the information includes a correspondence between a link-layer address and an Internet Protocol IP address that are of a terminal device, and the information is used to guide the network device to process a packet that is from the terminal device. Referring to a schematic diagram shown in FIG. 8, the network device may include a processor 501, a memory 502, a network interface 503, and a bus system 504.

The bus system 504 is configured to connect the processor 501, the memory 502, and the network interface 503.

The network interface 503 is configured to implement a communication connection between a network device and a terminal device. The network interface 503 may be implemented by an optical transceiver, an electrical transceiver, a wireless transceiver, or any combination thereof. For example, the optical transceiver may be a small form-factor pluggable (SFP) transceiver, an enhanced small form-factor pluggable (SFP+) transceiver, or a 10 gigabit small form-factor pluggable (XFP) transceiver. The electrical transceiver may be an Ethernet network interface controller (NIC). The wireless transceiver may be a wireless network interface controller (WNIC).

The memory 502 is configured to store a program instruction and data. The memory 502 may include a volatile memory, for example, a random access memory (RAM); or the memory may include a non-volatile memory, for example, a flash memory, a hard disk drive (HDD), or a solid-state drive (SSD); or the memory may include a combination of the foregoing types of memories.

The processor 501 is a central processing unit (CPU), or may be a combination of a CPU and a hardware chip. The hardware chip may be one or a combination of the following: an application-specific integrated circuit (ASIC), a field-programmable gate array (FPGA), a complex programmable logic device (CPLD), and a network processor (NP). The processor 501 is configured to read the program instruction and the data that are stored in the memory 502 to perform the following operations:

obtaining, by the processor, a first link-layer address;

determining, by the processor, whether a quantity of IP addresses corresponding to the first link-layer address in the information reaches a threshold, where the threshold indicates a maximum quantity of IP addresses that are corresponding to the first link-layer address and that can be stored in the network device;

if the quantity of IP addresses corresponding to the first link-layer address in the information reaches the threshold, selecting, by the processor, an IP address from the IP addresses corresponding to the first link-layer address, where a quantity of selected IP addresses is not greater than the maximum quantity;

saving, by the processor, a correspondence between the first link-layer address and the selected IP address; and sending, by the processor according to the selected IP address, a message to a terminal device having the first link-layer address, where the message is used to notify the terminal device having the first link-layer address whether an IP address is selected by the processor.

Figure 8:
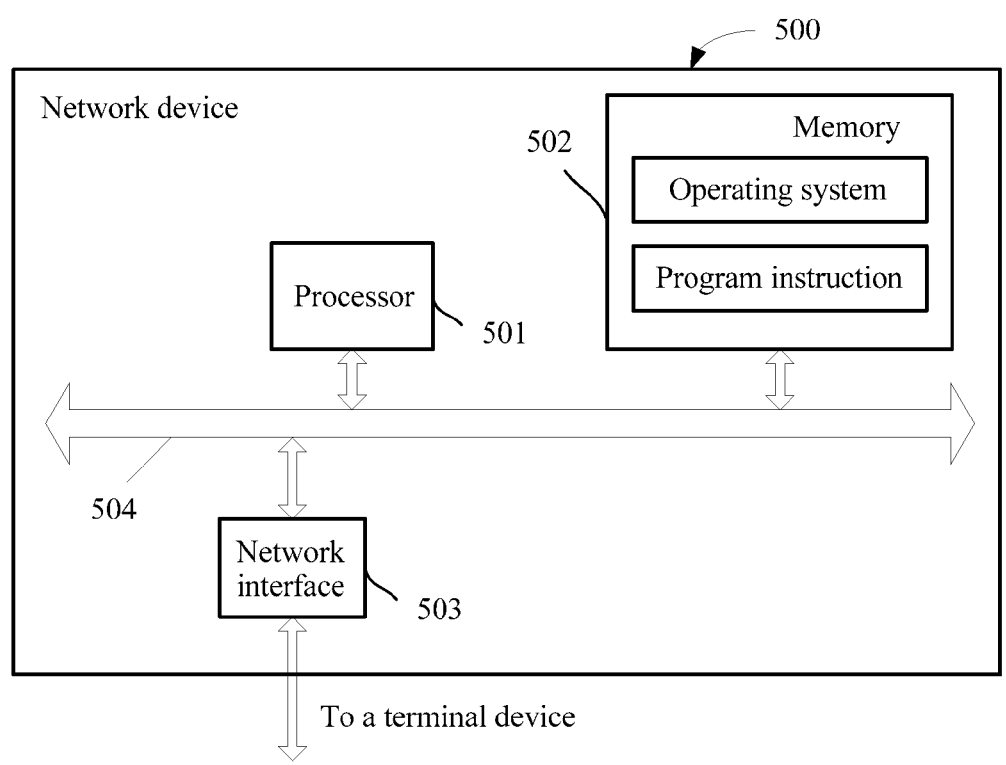
FIG. 8 is a schematic diagram of a hardware constitution of a network device according to an embodiment of the present disclosure.

For implementation details of the network device shown in FIG. 8, refer to the description of the method embodiment shown in FIG. 4, and details are not described herein.

Corresponding to the method shown in FIG. 5, an embodiment of the present disclosure further provides a terminal device 600, and the terminal device has a link-layer address. Referring to a schematic diagram shown in FIG. 9, the terminal device may include a processor 601, a memory 602, a network interface 603, and a bus system 604.

The bus system 604 is configured to connect the processor 601, the memory 602, and the network interface 603.

The network interface 603 is configured to implement a communication connection between a device and a network device. For a specific form of the network interface 603, refer to the description of the network interface 503 shown in FIG. 8.

The memory 602 is configured to store a program instruction and data. For a specific form of the memory 602, refer to the description of the memory 502 shown in FIG. 8.

For a specific form of the processor 601, refer to the description of the processor 501 shown in FIG. 8. The processor 601 is configured to read the program instruction and the data that are stored in the memory 602 to perform the following operations:

receiving, by the processor by using the network interface, a message sent by a network device, where the message is used to notify the terminal device whether an IP address is selected by the network device, and the message carries the link-layer address;

determining, by the processor according to the message, an IP address selected by the network device, where the selected IP address is corresponding to the link-layer address; and sending, by the processor, a packet to the network device, where a source IP address of the packet is the IP address selected by the network device, and a source link-layer address of the packet is the link-layer address.

Figure 9:
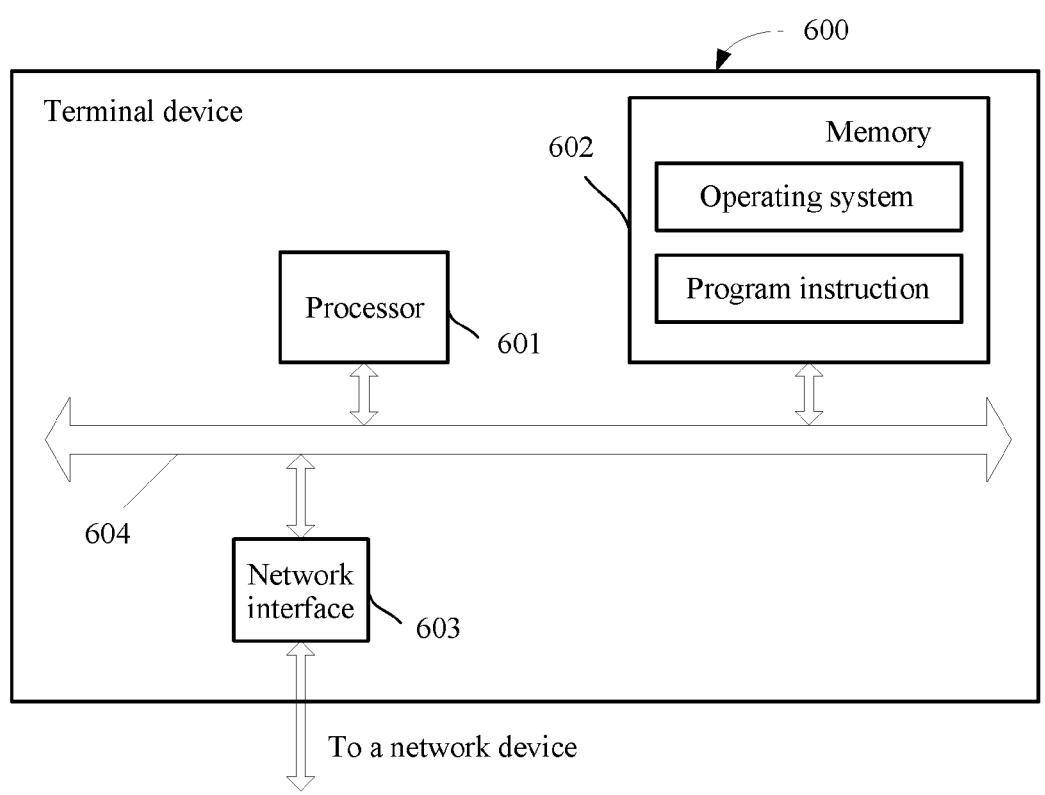
FIG. 9 is a schematic diagram of a hardware constitution of a terminal device according to an embodiment of the present disclosure.

For implementation details of the terminal device shown in FIG. 9, refer to the description of the method embodiment shown in FIG. 5, and details are not described herein.

From the foregoing descriptions of the implementations, a person skilled in the art may clearly understand that some or all steps of the methods in the embodiments may be implemented by software in addition to a universal hardware platform. Based on such an understanding, the technical solutions of the present disclosure essentially or the part contributing to the prior art may be implemented in a form of a software product. The software product may be stored in a storage medium, such as a read-only memory (ROM), a RAM, a magnetic disk, or an optical disc, and includes several instructions for instructing a computer device (which may be a personal computer, a server, or a network device such as media gateway) to perform the methods described in the embodiments or some parts of the embodiments of the present disclosure.

It should be noted that the embodiments in this specification are all described in a progressive manner, for same or similar parts in the embodiments, reference may be made to these embodiments, and each embodiment focuses on a difference from other embodiments. Especially, apparatus and device embodiments are basically similar to a method embodiment, and therefore are briefly described; for related parts, reference may be made to partial descriptions in the method embodiment. The described apparatus and device embodiments are merely examples. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of the present disclosure without creative efforts.

The foregoing descriptions are merely optional embodiments of the present disclosure, but are not intended to limit the protection scope of the present disclosure. It should be noted that a person of ordinary skill in the art may make certain improvements and polishing without departing from the principle of the present disclosure and the improvements and polishing shall fall within the protection scope of the present disclosure.

What is claimed is:

1. A method for communication between a network device and a terminal device, the method comprising:
   obtaining, by the network device, a first link-layer address, wherein the network device stores information, the information comprises a correspondence between a link-layer address and an Internet Protocol (IP) address that are of the terminal device, and the information is used to guide the network device to process a packet that is from the terminal device;
   determining, by the network device, whether a quantity of IP addresses corresponding to the first link-layer address in the information reaches a threshold, wherein the threshold indicates a maximum quantity of IP addresses that are corresponding to the first link-layer address and that can be stored in the network device;
   in response to determining that the quantity of IP addresses corresponding to the first link-layer address in the information reaches the threshold, selecting, by the network device, an IP address from the IP addresses corresponding to the first link-layer address, wherein a quantity of selected IP addresses is not greater than the maximum quantity;
   saving, by the network device, a correspondence between the first link-layer address and the selected IP address; and
   sending, by the network device according to the selected IP address, a message to a terminal device having the first link-layer address, wherein the message is used to notify the terminal device having the first link-layer address whether an IP address is selected by the network device.

2. The method according to claim 1, wherein:
   the obtaining, by the network device, the first link-layer address comprises: receiving, by the network device, a packet sent by the terminal device having the first link-layer address, wherein the packet comprises the first link-layer address and a first IP address; and
   the selecting, by the network device, the IP address from the IP addresses corresponding to the first link-layer address comprises: selecting, by the network device, an IP address from the IP addresses corresponding to the first link-layer address in the information and the first IP address.

3. The method according to claim 2, wherein before the determining, by the network device, whether the quantity of IP addresses corresponding to the first link-layer address in the information reaches the threshold, the method further comprises:
   determining, by the network device, whether the information comprises a correspondence between the first link-layer address and the first IP address;
   wherein the determining, by the network device, whether the quantity of IP addresses corresponding to the first link-layer address in the information reaches the threshold is performed in response to determining that the information does not comprise the correspondence between the first link-layer address and the first IP address.

4. The method according to claim 1, wherein:
   the message sent by the network device to the terminal device having the first link-layer address is a router advertisement (RA) message or a neighbor advertisement (NA) message, the message comprises an option field, and the option field is used to carry the selected IP address,
   wherein the option field comprises a type, a length, and a value, wherein the type indicates that a type of the option field is notifying an IP address selected by the network device, the length indicates a length of the option field, and the value is the selected IP address.

5. The method according to claim 1, wherein:
   the message sent by the network device to the terminal device having the first link-layer address is an Internet Control Message Protocol version 6 (ICMPv6) message, and the message notifies the terminal device having the first link-layer address whether an IP address is selected by the network device.

6. The method according to claim 5, wherein the ICMPv6 message comprises a type, code, and a packet content field, wherein the type indicates that a type of the ICMPv6 message is notifying an IP address not selected by the network device, the code indicates that a type of the packet content field is notifying that the first IP address is not selected by the network device, and the packet content field is the first IP address, or the packet content field is an indication indicating that the first IP address is not selected by the network device, or the packet content field is the packet.

7. A method for communication between a terminal device and a network device, the method comprising:
receiving, by a terminal device having a link-layer address, a message from the network device, wherein the message is used to notify the terminal device whether an Internet Protocol (IP) address is selected by the network device, and the message carries the link-layer address;
determining, by the terminal device according to the message, an IP address selected by the network device, wherein the selected IP address is corresponding to the link-layer address, wherein the network device stores information that comprises a correspondence between the link-layer address and at least one selected IP address, wherein a quantity of selected IP addresses is less than a maximum quantity of IP addresses that are corresponding to the link-layer address and that can be stored in the network device; and
sending, by the terminal device, a packet to the network device, wherein a source IP address of the packet is the IP address selected by the network device, and a source link-layer address of the packet is the link-layer address.

8. The method according to claim 7, wherein:
the message received by the terminal device is a router advertisement (RA) message or a neighbor advertisement (NA) message, the message comprises an option field, and the option field is used to carry the selected IP address,
wherein the option field comprises a type, a length, and a value, wherein the type indicates that a type of the option field is notifying an IP address selected by the network device, the length indicates a length of the option field, and the value is the selected IP address.

9. The method according to claim 7, wherein:
the message received by the terminal device is an Internet Control Message Protocol version 6 (ICMPv6) message, and the message notifies the terminal device whether an IP address is selected by the network device.

10. The method according to claim 9, wherein the ICMPv6 message comprises a type, a code, and a packet content field, wherein the type indicates that a type of the ICMPv6 message is notifying an IP address not selected by the network device, the code indicates that a type of the packet content field is notifying that a first IP address is not selected by the network device, and the packet content field is the first IP address, or the packet content field is an indication indicating that the first IP address is not selected by the network device, or the packet content field is the packet.

11. A network device, comprising:
a memory storing instructions;
a processor coupled to the memory and configured to execute the instructions; and
a network interface coupled to the processor;
wherein the network device stores information, the information comprises a correspondence between a link-layer address and an Internet Protocol (IP) address that are of a terminal device, and the information is used to guide the network device to process a packet that is from the terminal device;
wherein the processor is configured to obtain a first link-layer address and determine whether a quantity of IP addresses corresponding to the first link-layer address in the information reaches a threshold, wherein the threshold indicates a maximum quantity of IP addresses that are corresponding to the first link-layer address and that can be stored in the network device;
wherein the processor is configured to: in response to determining that the quantity of IP addresses corresponding to the first link-layer address in the information reaches the threshold, select an IP address from the IP addresses corresponding to the first link-layer address, wherein a quantity of selected IP addresses is not greater than the maximum quantity;
wherein the processor is configured to save a correspondence between the first link-layer address and the selected IP address; and
wherein the network interface is configured to send, according to the selected IP address, a message to a terminal device having the first link-layer address, wherein the message is used to notify the terminal device having the first link-layer address whether an IP address is selected by the network device.

12. The network device according to claim 11,
wherein the processor is configured to obtain the first link-layer address from the information;
wherein the processor is configured to select the IP address from the IP addresses corresponding to the first link-layer address in the information; and
wherein the processor is configured to: in response to determining that the quantity of IP addresses corresponding to the first link-layer address in the information is greater than the threshold, determine that the quantity of IP addresses corresponding to the first link-layer address in the information reaches the threshold, wherein the threshold is the maximum quantity.

13. The network device according to claim 11,
wherein the processor is configured to receive a packet sent by the terminal device having the first link-layer address, wherein the packet comprises the first link-layer address and a first IP address; and
wherein the processor is configured to select an IP address from the IP addresses corresponding to the first link-layer address in the information and the first IP address.

14. The network device according to claim 13, wherein before determining whether the quantity of IP addresses corresponding to the first link-layer address in the information reaches the threshold, the processor is configured to determine whether the information comprises a correspondence between the first link-layer address and the first IP address;
wherein in response to determining that the information does not comprise the correspondence between the first link-layer address and the first IP address, the processor is configured to determine whether the quantity of IP addresses corresponding to the first link-layer address in the information reaches the threshold.

15. The network device according to claim 11,
wherein the network interface is configured to send the message to the terminal device having the first link-layer address, wherein the message is a router advertisement (RA) message or a neighbor advertisement (NA) message, the message comprises an option field, and the option field is used to carry the selected IP address, wherein the option field comprises a type, a length, and a value, wherein the type indicates that a type of the option field is notifying an IP address selected by the network device, the length indicates a length of the option field, and the value is the selected IP address.

16. The network device according to claim 11, wherein:

wherein the network interface is configured to send the message to the terminal device having the first link-layer address, wherein the message is an Internet Control Message Protocol version 6 (ICMPv6) message, and the message notifies the terminal device having the first link-layer address whether an IP address is selected by the network device.

17. A terminal device, comprising:

a memory storing instructions;

a processor coupled to the memory and configured to execute the instructions; and a network interface coupled to the processor;

wherein the terminal device is associated with a link-layer address;

wherein the network interface is configured to receive a message from a network device, wherein the message is used to notify the terminal device whether an Internet Protocol (IP) address is selected by the network device, and the message carries the link-layer address;

wherein the processor is configured to determine, according to the message, an IP address selected by the network device, wherein the selected IP address is corresponding to the link-layer address, wherein the network device stores information that comprises a correspondence between the link-layer address and at least one selected IP address, wherein a quantity of selected IP addresses is less than a maximum quantity of IP addresses that are corresponding to the link-layer address and that can be stored in the network device; and wherein the network interface is configured to send a packet to the network device, wherein a source IP address of the packet is the IP address selected by the network device, and a source link-layer address of the packet is the link-layer address.

18. The terminal device according to claim 17, wherein the network interface is configured to receive a router advertisement (RA) message or a neighbor advertisement (NA) message that is sent by the network device, the message comprises an option field, and the option field is used to carry the selected IP address, wherein the option field comprises a type, a length, and a value, wherein the type indicates that a type of the option field is notifying an IP address selected by the network device, the length indicates a length of the option field, and the value is the selected IP address.

19. The terminal device according to claim 17, wherein:

wherein the network interface is configured to receive an Internet Control Message Protocol version 6 (ICMPv6) message sent by the network device, and the message notifies the terminal device whether an IP address is selected by the network device.

20. The terminal device according to claim 19, wherein the ICMPv6 message comprises a type, code, and a packet content field, wherein the type indicates that a type of the ICMPv6 message is notifying an IP address not selected by the network device, the code indicates that a type of the packet content field is notifying that a first IP address is not selected by the network device, and the packet content field is the first IP address, or the packet content field is an indication indicating that the first IP address is not selected by the network device, or the packet content field is the packet.

* * * * *